Figure 1:
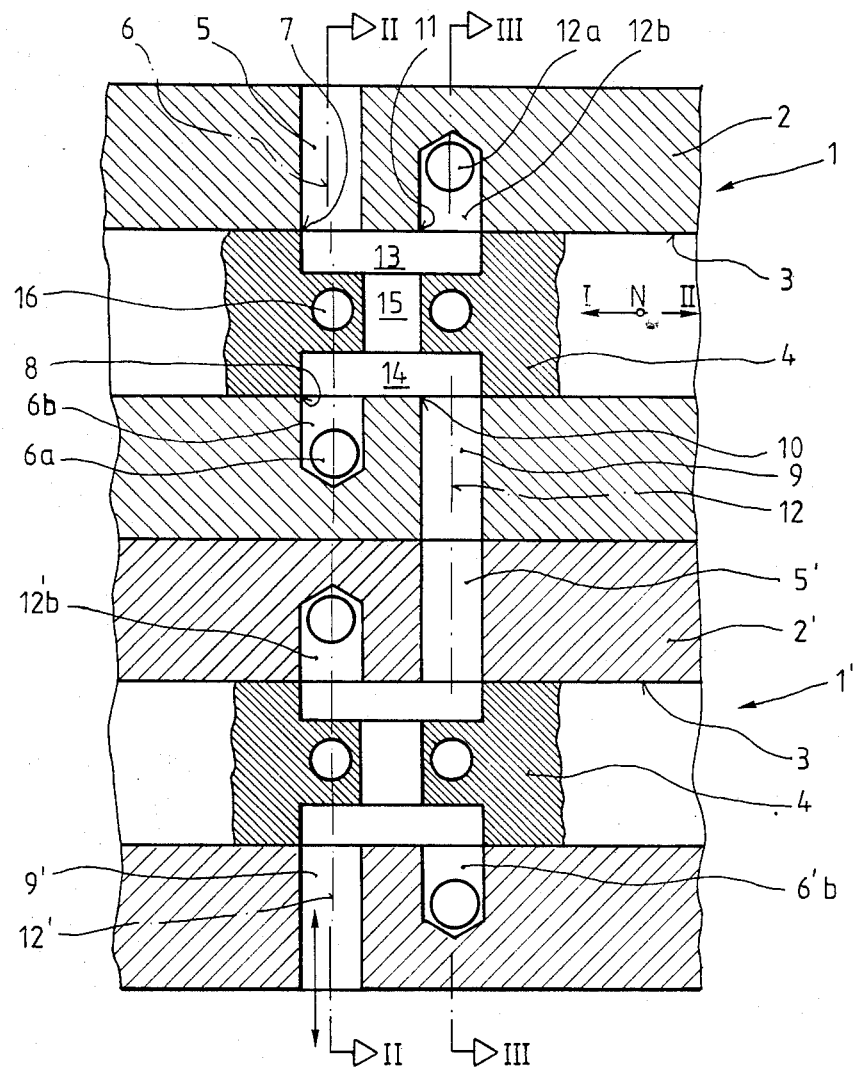

United States Patent [19]

Brunner

[11] Patent Number: 4,532,960
[45] Date of Patent: Aug. 6, 1985

[54] CONTROL VALVE DEVICE

[75] Inventor: Rudolf Brunner, Baldham, Fed. Rep. of Germany

[73] Assignee: Heilmeler & Weinlein Fabrik Fuer Oel-Hadraulik GmbH & Co., KG, Fed. Rep. of Germany

[21] Appl. No.: 588,076

[22] Filed: Mar. 9, 1984

[30] Foreign Application Priority Data

Oct. 3, 1983 [DE] Fed. Rep. of Germany ....... 3308576

[51] Int. Cl.³ .............................................. F15B 13/08
[52] U.S. Cl. ............................ 137/596.13; 137/625.68
[58] Field of Search ........................ 137/596.13, 625.68

[56] References Cited

U.S. PATENT DOCUMENTS

| 3,820,568 | 6/1974  | Brunner et al. | 137/596.13 X |
| 4,301,837 | 11/1981 | Brunner        | 137/625.68   |
| 4,323,087 | 4/1982  | Brunner        | 137/596.13 X |

FOREIGN PATENT DOCUMENTS

| 2912730 | 10/1980 | Fed. Rep. of Germany | 137/625.68 |
| 2914828 | 10/1980 | Fed. Rep. of Germany | 137/625.68 |
| 2915096 | 10/1980 | Fed. Rep. of Germany | 137/625.68 |
| 3000591 | 7/1981  | Fed. Rep. of Germany | 137/625.68 |
| 2040410 | 8/1980  | United Kingdom       | 137/625.68 |
| 2069663 | 8/1981  | United Kingdom       | 137/625.68 |

*Primary Examiner*—Gerald A. Michalsky

*Attorney, Agent, or Firm*—Kinzer, Plyer, Dorn & McEachran

[57] ABSTRACT

Control valve device, in particular for hydraulic systems having high flow rates, comprising a housing provided with a bore within which a piston slide means can be displaced from a neutral position with zero-pressure flow to at least one control position, and further comprising at least one pressure passage leading to and at least one discharge passage leading away from the housing bore, said pressure passage and discharge passage being adapted to be interconnected through flow conduits provided in the piston slide means. In known control valve devices of this type, the flow paths for the zero-pressure flow must be very large in the case of high flow rates; when the piston slide means carries out adjusting movements, undesirable jamming forces are caused at said piston slide means which obstruct the adjusting movements, herein avoided by providing the features that within the housing bore the discharge passage orifice is displaced relative to the pressure passage orifice in the longitudinal direction of the bore, that these orifices are diametrically opposed by recesses of the same size, which are each open towards the housing bore and which each have applied thereto the pressure existing in the opposite passage via connection passages provided within the housing or within the piston slide means, and that the piston slide means has provided therein in front of each passage orifice a longitudinally extending pocket bridging the displacement between the passage orifice and a neighboring recess.

15 Claims, 8 Drawing Figures

CONTROL VALVE DEVICE

DESCRIPTION

The present invention refers to a control valve device of of the type indicated in the generic clause of patent claim 1.

In the case of a control valve device of this type, which is known from German Pat. No. 21 52 830, the pressure passage is in alignment with the discharge passage so that the pressure passage orifice leading to the housing bore is diametrically opposed to the discharge passage orifice. The piston slide means has provided therein a through-hole, which, in the neutral position, rectilinearly connects the pressure passage to the discharge passage. If, however, the piston slide means is moved to a control position, the connection between the pressure passage and the discharge passage will be blocked by the circumference of the piston slide means. The area of the pressure passage orifice will then have applied thereto the pressure medium having the respective working pressure, whereas the area of the discharge passage orifice is at zero pressure. This has the effect that the piston slide means is subjected to one-sided pressure within the housing bore due to which the sensitive adjusting movement will be impaired. In the case of low flow rates and, consequently, comparatively small cross-sections for the zero-pressure flow this drawback is put up with, However, in the case of higher flow rates, such as 200 liters/minute or more, the flow cross-sections for the zero-pressure flow increase to such an extent that the forces created on the basis of these larger cross-sections in the case of a blocked zero-pressure flow become excessively great. Practical experience has shown that the upper limit for the diameter of the flow paths for the zero-pressure flow is 6.5 up to 7.5 mm at the most. Larger diameters, like those required for high flow rates, result in strong jamming of the piston slide means. In the case of one embodiment of the known control valve device (FIG. 6) it is endeavoured to obtain pressure compensation for the piston slide means on the basis of the fact that, below the centre of the housing bore, the pressure passage ends in said housing bore in alignment with the discharge passage and is adapted to be connected to said housing bore via a through-hole provided in the piston slide means. Moreover, the housing has provided therein a connection passage which extends from the side opposite the pressure passage to the housing bore and which has applied thereto the same pressure as the pressure passage itself. This connection passage bypassing the housing bore is in alignment with a connection passage which leads to the discharge passage and by-passes the housing bore as well and which has applied thereto the pressure in the discharge passage. The piston slide means has provided therein an additional through-hole which lies in the same axial plane as the through-hole between the pressure passage and the discharge passage and which, in the case of zero-pressure flow, interconnects the two connection passages. In the case of zero-pressure flow, the pressure medium flow is distributed to two paths and flows through the piston slide means in two opposite directions. In a control position of the piston slide means, in which said piston slide means blocks the zero-pressure flow, the piston slide means has applied thereto pressure from two sides, whereby the risk of jamming is reduced. However, this solution shows the essential drawback that in the connection passages the flow resistance for the pressure medium is much higher than on the second, rectilinear, continuous path. In the case of zero-pressure flow, however, a flow resistance which must be as low as possible is important. In view of the fact that the two paths taken by the pressure medium in the zero-pressure flow position have markedly differing flow resistances, a disequilibrium entailing one-sided loads on the piston slide means will exist in this case as well. Moreover, the two through-holes provided in the piston slide means are limited in size due to the diameter of the piston slide means and cause inexpediently high flow losses on both flow paths. The fundamental advantage of this known piston slide means is to be seen in the fact that the zero-pressure flow takes place in the same axial area of the piston slide means as the pressure medium flow control of the pressure medium flowing to the consumers, which, in the final analysis, will result in piston slide means having a short overall length and housings having a short overall length, since no separate plane is required for the zero-pressure flow when said zero-pressure flow is angularly displaced relative to the working plane of the control valve. In the case of the embodiment of the known control valve device including the two paths of the pressure medium an additional drawback is caused by the fact that in the case of several piston slide means which are provided in one and the same housing and which permit a continuous zero-pressure flow the aimed-at pressure compensation effect will be lost when both piston slide means are actuated or when, in the case of a piston slide means which has already been actuated, also the second piston slide means has to be actuated.

The problem of pressure compensation is of no importance in connection with control valve devices (e.g. German Offenlegungsschrift No. 22 52 772) in the case of which the pressure medium is controlled by annular punctures in the housing bore and/or in the piston slide means, since the pressure is then uniformly distributed over the entire circumference of the piston slide means. However, in the case of this mode of construction it is absolutely necessary to provide for the zero-pressure flow also at least one or two axial areas of the piston slide means and of the housing, which must be located separately from the axial working areas within which the pressure medium flow control is carried out, since the entire circumferential area of the piston slide means and of the housing bore, respectively, is required for each flow path independently.

Furthermore, control valve devices are known in the case of which the zero-pressure flow takes place in the same axial area of the piston slide means as the pressure medium flow control, i.e. the pump supply passage, but it is angularly displaced relative thereto. In the case of such control valve devices the one-sided pressure pressing the piston slide means against the housing bore is compensated for by means of additional structural measures producing additional pressure cushions on the circumference of the piston slide means which are supposed to provide pressure compensation. However, up to now it has not been possible to provide satisfactory pressure compensation on the basis of these suggestions, this being particularly true in cases in which these control valve devices had to be used for large flow volumes.

The invention is based on the technical problem of providing a control valve device of the type mentioned at the beginning in the case of which not least the structural design of the piston slide means and of the housing guarantee right from the beginning that one-sidedly effective forces impairing the adjusting movement of the piston slide means cannot be created between the neutral position and the control position of the piston slide means, this being guaranteed independently of the magnitude of the respective flow volume.

The above-mentioned problem is solved in accordance with the invention by means of the features indicated in the characterizing clause of patent claim 1.

Due to this structural design of the housing and of the piston slide means and due to the flow guide system for the zero-pressure flow resulting from the combined effect of these two components, the creation of one-sided jamming forces acting on the piston slide means is prevented right from the beginning. It is thus possible to dispense with additional structural measures which, in particular in the case of high flow rates, would be absolutely necessary for achieving pressure compensation at the slide means. Pressure compensation for the piston slide means in maintained in every position between the neutral position and the control position. Also in the case of large flow volumes a flow resistance which is so minute that it need not be taken into account is achieved for the zero-pressure flow, since the flow paths are provided such that they have optimum cross-sections and that they take an advantageous course. These flow paths may be substantially symmetrical with regard to the piston slide means so that substantially identical conditions exist for the flow towards both sides of the piston slide means and away from both sides of said piston slide means. Pressure compensation is also fully maintained if several control valves having such a structural design and providing a continuous zero-pressure flow are attached to one another and if an arbitrary one or several of these control valves are then actuated. Furthermore, it is particularly advantageous that on the basis of this structural design the zero-pressure flow takes place in the same axial area of the housing and of the piston slide means as the pressure medium supply from the pump supply to the housing bore and through the piston slide means with the aid of which it is then directed to one of the respective consumers. Although the pressure passage and the discharge passage are displaced relative to each other and although the recesses are provided, an additional axial area is required neither in the housing nor in the piston slide means, which additional axial area would have the effect that the overall length of said components would have to be increased. In practical operation, the axial area within which the zero-pressure flow as well as the pressure medium supply for the pressure medium flow control take place is determined by the distance between the consumer connections. In view of the fact that the connection fittings provided on the housing for the lines leading to the consumers must have a specific minimum size, it is not possible to arrange the consumer connections in an arbitrarily proximate relationship, but the axial housing and piston slide means area between the consumer connections always has dimensions which are sufficient for accommodating the zero-pressure flow without any problems. Furthermore, this structural design entails in an advantageous manner the effect that not only the circumferential surface areas which have applied thereto pressure medium coming from the pressure passage are of the same size and are diametrically opposed at the piston slide means but that also the surface areas of the circumference of the piston slide means which have applied thereto the minor pressure of the discharge passage or which have not applied thereto any pressure at all are of the same size on both sides of the piston slide means and are diametrically opposed.

This effect is produced in the case of each intermediate position of the piston slide means between the neutral position and the control position, the size of the surface areas varying with the movement of the piston slide means; but the extent to which said size varies is the same on both sides of the piston slide means. The pockets which are provided within the piston slide means and which contribute to the flow guiding effect of the zero-pressure flow and to the pressure compensation, respectively, can easily be located in a circumferential area of the piston slide means where they do not overlap with other flow guide means, such as those used for pressure medium flow control.

An expedient embodiment of the invention, in the case of which respective by-pass conduits having applied thereto the pressure existing in the pressure passage and the pressure existing in the discharge passage, respectively, bypass the housing bore within the housing and end in the housing bore opposite the respective passage, is disclosed in claim 2. In contrast to the known embodiment according to German Pat. No. 21 52 830, FIG. 6, the above-mentioned embodiment does not directly guide the pressure medium from the pressure passage into the discharge passage and from the pressure connection passage to the discharge connection passage in the case of zero-pressure flow, which would have the effect that one-sided forces acting on the piston slide means were produced and that different flow resistances on both paths could not be avoided, but in the case of said embodiment a symmetrical flow on both paths is achieved, which does not only show the overall characteristic of a low flow resistance in the case of zero-pressure flow but which also avoids right from the beginning the creation of jamming forces acting on the piston slide means, this being also the case when several control valves providing a continuous zero-pressure flow are attached to one another and are actuated individually or jointly. The structural expenditure for this embodiment is acceptably low, since the recesses can be produced by means of the same tool and within the same working process as the pressure and discharge passages and since a sufficient amount of space for accommodating the pressure and discharge connection passages is available within the housing in this axial area.

A further expedient feature is the feature of claim 3 according to which, in the case of zero-pressure flow, the flow of pressure medium is guided on two paths which are substantially separated from each other within the housing. It is thus possible to achieve high flow rates also by means of flow paths having comparatively small diameters, which high flow rates have to overcome only an acceptably low flow resistance. This is a particularly important aspect, since, in order to avoid energy losses and an inexpedient heating of the pressure medium in the case of zero-pressure flow, the entire amount of pressure medium supplied by the pressure source has to flow through with the least possible losses.

In view of the fact that in the case of this embodiment the pressure medium flows on two separate flow paths through the control valve device in the case of zero-pressure flow and outer influences can vary the flow rates and the pressures within the two flow paths relative to one another—which, in turn, might have the effect that one-sided jamming forces are created at the piston slide means—the feature of claim 4 is important as well. The pressure compensation passage in question counterbalances this effect which may perhaps cause disadvantages.

An additional, advantageous embodiment of a control valve device according to the invention, which comprises in one housing at least two housing bores which each contain a piston slide means, is characterized by the features emphasized in claim 5. In the case of this embodiment it is guaranteed by means of the separate flow guide systems of both housing bores that ideal pressure compensation always exists at both piston slide means regardless of whether the first or the second piston slide means is displaced or whether both piston slide means are displaced simultaneously.

An additional, expedient embodiment of the control valve device according to the invention, which comprises in one housing two housing bores with piston slide means accommodated therein, is disclosed in claim 6. Due to this arrangement of the connection openings this control valve is compatible with other control valves having a structural design of the same kind, when it is necessary to achieve a continuous zero-pressure flow through all interconnected control valves.

A further, expedient embodiment of the control valve device according to the invention, which comprises two control valves having their housing sides attached to each other and providing continuous zero-pressure flow, is explained in claim 7. In the case of this embodiment two housings which are adapted to be fitted together differ from each other with regard to the position of the connection openings on the outer sides of the housings. This displacement between the connection openings results from the fact that the respective passages leading to the housing bore within the housing should preferably be as short as possible and should extend towards the housing bore along a rectilinear line. Hence, due to the displacement between the pressure passage and the discharge passage, also the connection openings on both housing sides are displaced relative to one another. If less importance is attached to this point, the connection openings on both housing sides of a housing can also be positioned such that each housing is compatible with an identical housing. In this case it will, however, be necessary to provide the pressure passage and the discharge passage and the pressure and discharge connection passages, respectively, such that they extend obliquely within the housing or such that they are bent. Another conceivable possibility would be the insertion of adapter plates between the housings of control valves which have to be attached to one another and which belong to the control valve device, said adapter plates compensating for the displacement between the connection openings.

An additional, particularly important embodiment of the invention is disclosed in claim 8. In the case of this alternative embodiment only one single pressure passage having suitably large dimensions extend towards the housing bore and only one single discharge passage having suitably large dimensions extends from the housing bore to the other side of the housing. The flow guide systems, which provide ideal pressure compensation for the piston slide means, are mainly accommodated within the piston slide means in the case of this embodiment. However, a completely symmetrical flow on both sides of the piston slide means is again obtained. The surface areas which have pressure applied thereto as well as the surface areas which do not have pressure applied thereto are symmetrically arranged on both sides of the circumference of the piston slide means so that pressure compensation can be guaranteed in each piston slide means position between the neutral position and the control position. It is in this connection expedient when the feature of claim 9 is provided, since these comparatively small through-holes can easily be accommodated in the longitudinal area of the piston slide means which is available due to the distance between the consumer connections located in a different working plane.

In view of the fact that in the case of this embodiment, the zero-pressure flow of the neutral position of the piston slide means takes place through the passage between the pockets and in view of the fact that it is important to have the least possible flow resistance in the case of zero-pressure flow, the feature of claim 10 is essential. Sharp rerouting of the flow is in this case avoided.

Finally, an additional, expedient embodiment of a control valve device comprising at least two control vlaves having their housings attached to one another and providing continuous zero-pressure flow is disclosed in claim 11. In view of the fact that, for reasons of flow technology, the pressure passage and the discharge passage extend towards the housing bore and away from the housing bore along a rectilinear line, the housings of several control valves which are to be combined in one control valve device are matched in pairs by providing the pressure passage such that within one housing it is displaced to one side relative to the discharge passage, whereas in the other matching housing the pressure passage is displaced to the other side. This pair consisting of housings which are adapted to be fitted together can be selectively combined with additional pairs or also with individual housings. In cases in which it is of no importance whether the pump connection and the consumer connections, respectively, are located on the same housing sides when control valves are arranged side by side in one control valve device, it is also possible to compensate for the displacement of the connection openings on both outer sides of the housings by connecting the respective second housing to the first housing such that it is rotated by 180° about the longitudinal axis of the housing bore.

In the following, embodiments of the invention will be explained while making reference to the drawing, in which FIG. 1 shows a longitudinal section through a first embodiment of a control valve device with two control valves, which are attached to each other, in the zero-pressure flow position, FIGS. 2 and 3 each show a cross-section through the control valve device of FIG. 1 in the planes II—II and III—III, four control valves providing a continuous zero-pressure flow being in this case attached to one another.

Figure 4:
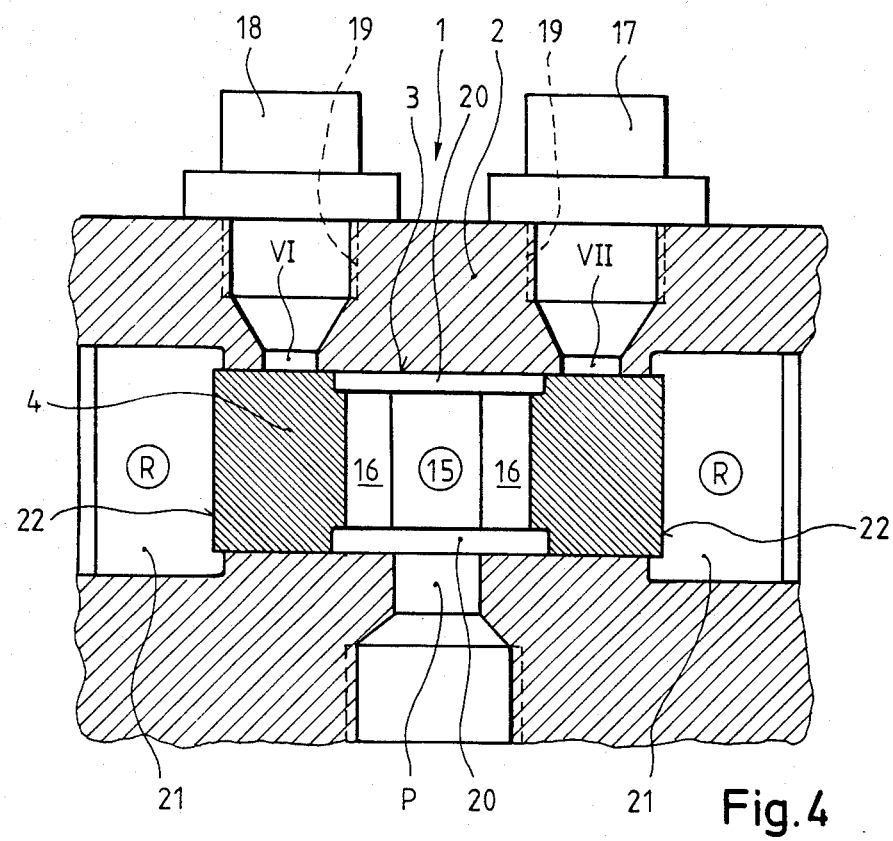
Figure 5:
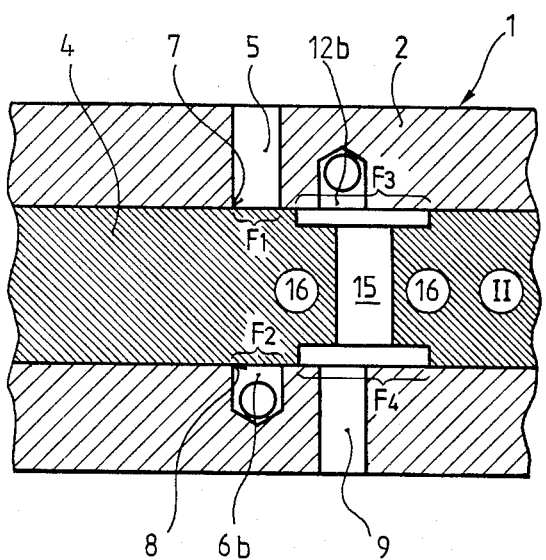
Figure 6:
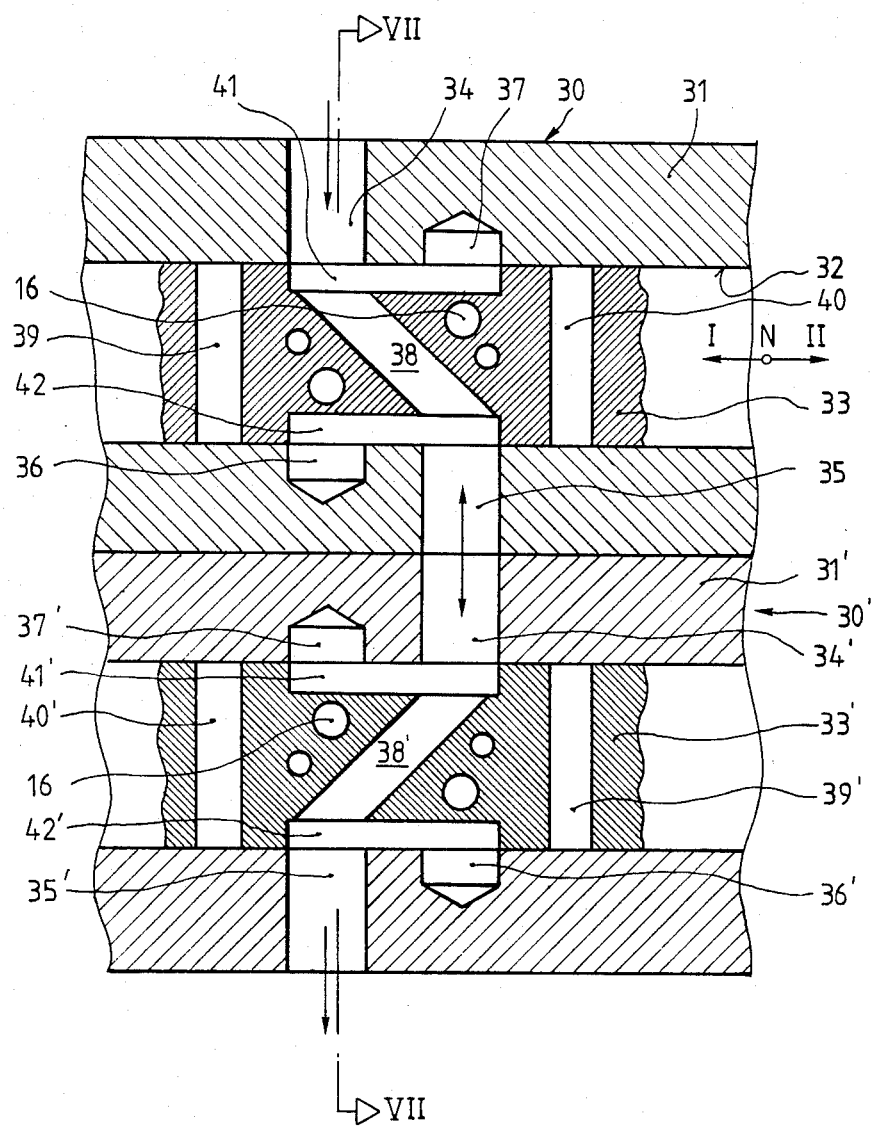
Figure 7:
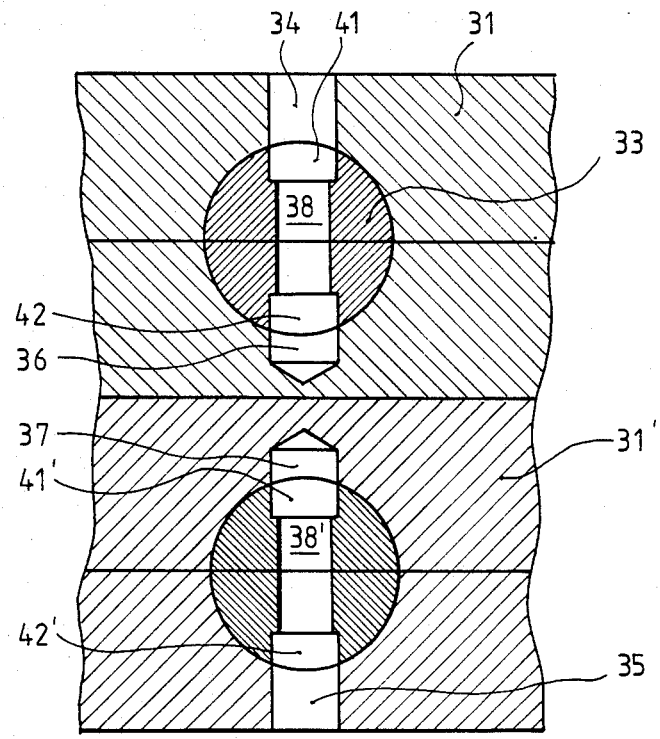
Figure 8:
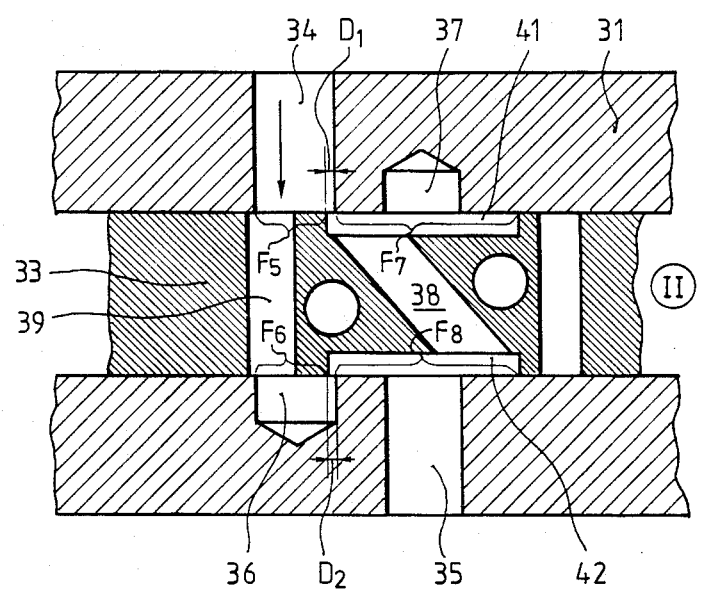

FIG. 4 a longitudinal section, rotated by 90°, through a a control valve of the control valve device of FIG. 1, FIG. 5 a longitudinal section through a control valve of the control valve device of FIG. 1 in a control position, FIG. 6 a longitudinal section through a second embodiment of a control valve device with two control valves, which are attached to each other, in the zero-pressure flow position, FIG. 7 a cross-section through the control valve device of FIG. 6 in the plane VII—VII, and FIG. 8 a longitudinal section through a control valve of the control valve device of FIG. 6 in an intermediate position between the neutral position and a control position.

Figure 2:
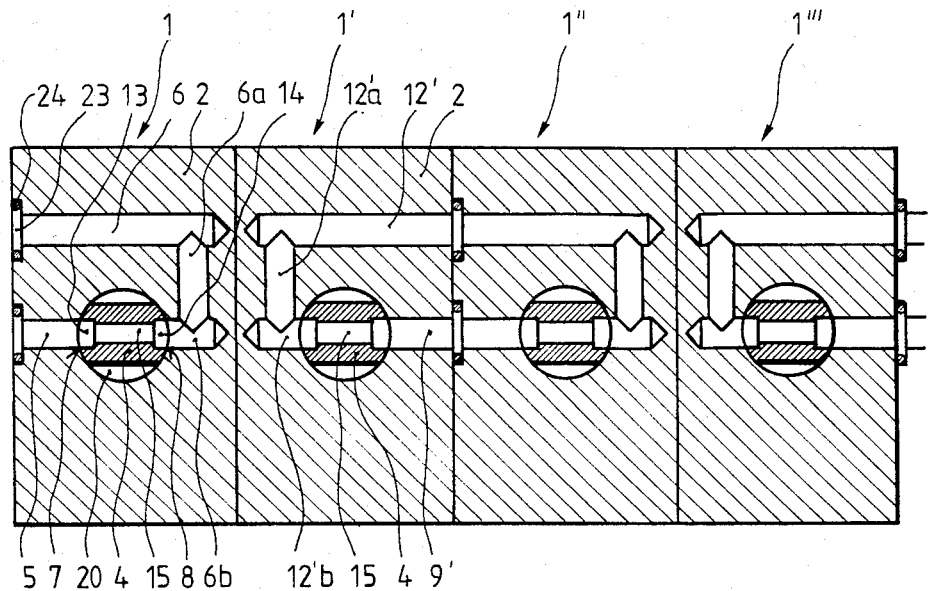
Figure 3:
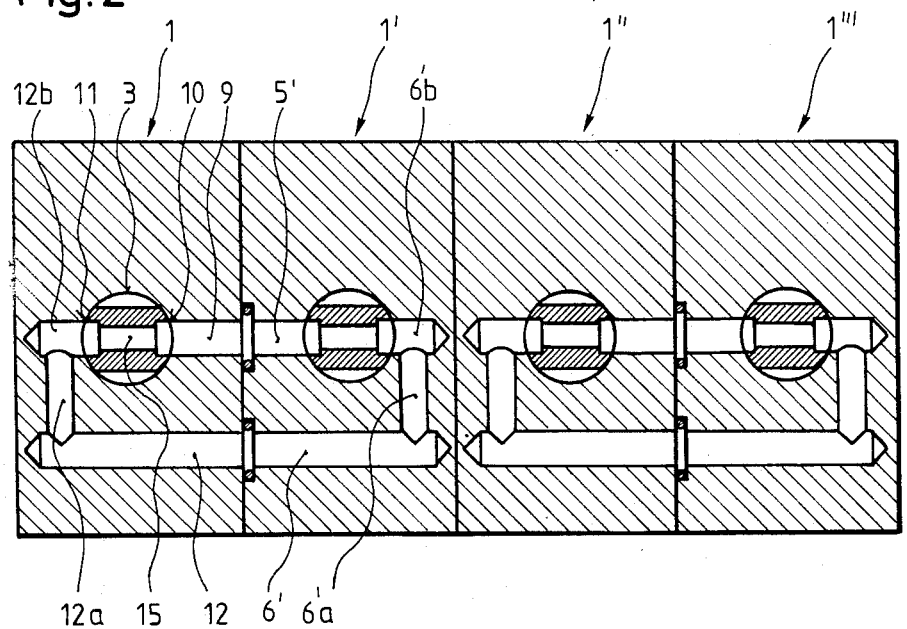

A control valve device according to FIGS. 1 to 5 has inserted therein—although also a single control valve 1 can be inserted individually—several control valves, 1, 1' and in FIGS. 2 and 3 also control valves 1" and 1"' which have the outer sides of their housings 2, 2' attached to one another in such a way that a continuous flow connection is established between said control valves. The individual control valves can be actuated independently of one another or also simultaneously with one another.

The control valve 1 of FIG. 1, represented in section in its plane of zero-pressure flow, has in its housing 2 a housing bore 3 within which a piston slide means 4 is guided such that it can be moved between a neutral position N and first and second control positions I, II. A rectilinear pressure passage 5 leads from the outer side of the housing to the housing bore 3, the orifice of said pressure passage being provided with reference numeral 7. An orifice 10 belonging to a discharge passage 9 leading from the housing bore 3 to the other side of the housing is disposed in the longitudinal direction of the housing bore such that it is displaced relative to the orifice 7.

As can be seen in FIG. 2, a by-pass conduit of the housing bore 3 is provided within the housing 2 above the pressure passage 5, said by-pass conduit beginning at the same housing side as the pressure passage 5 and consisting of a pressure connection passage 6, 6a and of a recess 6b, the orifice 8 of said recess being diametrically opposed to the orifice 7 within the housing bore 3.

FIG. 3 shows how a by-pass conduit leads round the housing bore 3 below the discharge passage 9 in the sectional plane III—III which is axially displaced relative to the axial plane II—II, said by-pass conduit consisting of a discharge connection passage 12, 12a and of a recess 12b whose orifice 11 is diametrically opposed to the orifice 10. The size of orifice 11 corresponds to that of orifice 10. The recess 12b is open towards the housing bore 3. The distance between the orifices 7 and 11 is bridged by a pocket 13 formed in the piston slide means, whereas the distance between the orifice 8 and the orifice 10 is bridged by a pocket 14. The pockets 13 and 14 are interconnected via a pressure compensation passage 15 provided in the piston slide means 4. Passages 16 extend through the piston slide means 4 on both sides of the pressure compensation passage 15 in a direction perpendicular to the plane of zero-pressure flow which is shown in FIG. 1; the function of these passages 16 will be explained hereinbelow on the basis of FIG. 4.

It follows that on the two opposed outer housing sides the connection openings 23 (FIG. 2) are located such that they are displaced relative to each other to an extent corresponding to the extent of displacement between the pressure passage 5 and the discharge passage 9. For the purpose of sealing each connection opening 23, a sealing ring 24 is inserted in the outer side of the housing.

The housing 2' of the control valve 1', which is the lower housing in the case of FIG. 1, contains the pressure passage 5' and the discharge passage 9' with reverse displacement so that the two housings 2, 2' can be attached to each other for the purpose of establishing a smooth flow connection. If the control valve device comprises several control valves, a housing 2' is again attached in the upper part of FIG. 1, whereas a housing 2 can again be attached to the lower part of the housing 2'.

FIG. 4 shows a schematic representation of the control valve 1 of FIG. 1 in a section through the working plane of said valve. The working plane is—when seen with regard to the longitudinal axis of the housing bore—displaced by 90° relative to the plane of zero-pressure flow. A pump connection P leads to the housing bore 3 in the working plane and consumer connections V1 and V2 are provided within the housing bore opposite said pump connection and laterally displaced relative thereto; tapped holes 19 lead from said consumer connections V1 and V2 to the outer side of the housing. Connections fittings 17, 18 are screwed into said tapped holes 19 and are used for the purpose of connecting the consumer lines. Due to the axial size of the connection fittings 17, 18, a specific axial distance has to be provided between the consumer connections V1 and V2, which axial distance can be used for accommodating the flow guide systems for the zero-pressure flow (FIG. 1) so that it is not necessary to choose inexpediently long housing and/or piston slide means dimensions.

In the working plane, the piston slide means 4 has provided therein diametrically opposed and longitudinally extending flow pockets 20 which are interconnected by passages 16. Perpendicular to said passages 16, the pressure compensation passage 15 extends between the pockets 13, 14 for zero-pressure flow. The ends of the housing bore 3 define return chambers 21 connected to the return system of the control valve via return connections R. The return connections R can also lead to the discharge passage 9 and the discharge connection passage 12, 12a, respectively, or to the recess 12b. The end faces of the piston slide means 4, which are provided with reference numeral 22, are in this case used for pressure medium flow control, which means that in one control position of the piston slide means a consumer connection V1 or V2 is connected to a return chamber 21, whereas the respective other consumer connection V1 or V2 is connected to the pump supply P via the flow pockets 20 and the passages 16.

In FIG. 1 both control valves 1 and 1' are shown in the neutral position with zero-pressure flow. The pressure medium coming from the pressure source is also present in the pump supply P, it can, however, not reach any of the consumer connections V1 or V2, since these consumer connections are blocked by the piston slide means. Hence, the pressure medium flows through the pressure passage 5 and simultaneously also through the pressure connection passage 6, 6a into the recess 6b. The pressure medium entering the pocket 13 through the orifice 7 is rerouted and reaches the recess 12b from where it flows into the discharge connection passage 12a and 12 and, consequently, to the other side of the housing. At the same time, the pressure medium flows out of the recess 6b via the pocket 14 into the discharge passage 9 and from said discharge passage to the outer side of the housing. A possibly existing disequilibrium of pressure between the pockets 13 and 14 is compensated for by the pressure compensation passage 15. The surface areas of the piston slide means 4 which are acted upon by the pressure medium have the same size on both sides so that said pressure is balanced.

When the piston slide means 4 (cf. FIG. 5) is moved to its second control position II, the orifices 7 and 8 are gradually closed after the fashion of a variable-size aperture so that the amount of pressure medium reaching the recess 12b and the discharge passage 9, respectively, is more and more reduced. The pressure increases more and more. In spite of this fact, the piston slide means is maintained in a condition of pressure balance, since the increasing pressure acts on the diametrically opposed, equally dimensioned surface areas of the circumference of the piston slide means. Also the low pressure existing within the discharge passage 9 and within the recess 12b acts on diametrically opposed, equally dimensioned surface areas. When the piston slide means 4 is displaced, the end of the pocket 20 gradually passes the consumer connection V2 so that the pressure medium coming into the pump supply P as the pressure increases will gradually flow to the consumer connection connected thereto. The left end face 22 of the piston slide means 4 uncovers the consumer connection V1 to a corresponding extent so that pressure medium can flow from said consumer connection into the return chamber 21 and from said return chamber into the return connection R. In the control position II (FIG. 5) the working pressure from the pressure passage 5 and from the pressure connection passage 6, 6b is applied to surface areas F1 and F2 of the circumference of the piston slide means in the area of the orifices 7, 8. In view of the fact that these surface areas have the same size, one-sided jamming of the piston slide means is prevented. The pressure on the surface areas F3 and F4 is relieved to a corresponding extent via the recess 12b and the discharge passage 9 so that in this case, too, a dis-equilibrium of forces is prevented. Neither the adjusting movement of the piston slide means to said control position nor a subsequent return of the piston slide means to the neutral position is obstructed by jamming of said piston slide means.

The same applies to the control valve 1' in FIG. 1 and also to the additional control valves 1'' and 1''' of FIGS. 2 and 3.

In the case of the additional embodiment according to FIGS. 6, 7 and 8, the control valve device comprises two control valves 30, 30' whose housings 31, 31' are attached to each other. The housing 31 is provided with a housing bore 32 within which a piston slide means 33 is guided so as to be longitudinally displaceable between a neutral position and two control positions I and II. A pressure passage 34 leads to the housing bore 32, whereas a discharge passage 35, which is displaced relative to the pressure passage 34 in the longitudinal direction of the bore, leads away from the housing bore 32 and to the other side of the housing. A recess 36, which is located opposite the pressure passage 34, is provided within the housing bore and is open towards said housing bore 32, whereas a recess 37 is diametrically opposed to the discharge passage 35, said recess 37 being open towards the housing bore 32 as well. The size of the orifices of the pressure and discharge passages 34, 35 and of the recesses 36, 37, respectively, is the same.

The piston slide means 33 is provided with diametrically opposed, longitudinally extending pockets 41, 42 bridging the displacement between the pressure passage 34 and the neighbouring recess 37 and the discharge passage 35 and the neighbouring recess 36, respectively, this bridging being effected in the zero-pressure flow position shown. The pockets 41 and 42 are flow connected via an oblique connection passage 38, the obliqueness of the connection passage 38 corresponding to the displacement between the pressure passage 34 and the discharge passage 35 so that a largely continuous flow path exists for the zero-pressure flow. In the plane of the zero-pressure flow, the piston slide means 33 has provided therein through-holes 39, 40 which are located in front of and behind the pockets in spaced relationship therewith, the through-hole 39 connecting in the second control position II the pressure passage 34 to the recess 36, whereas in the first control position the through-hole 40 connects the discharge passage 35 to the recess 37. The passages 16 for the pressure medium flow control extend between the through-holes 39 and 40 and the connection passage 38.

The control valve 30' either has the same structural design as the control valve 30, in which case it is arranged such that it is rotated by 180° about the longitudinal axis of the bore, so that the pump supply to said control valve is located opposite the pump supply provided in the case of control valve 30, or the housing of said control valve 30' is designed such that the displacement between the pressure passage 34' and the discharge passage 35' is reversed in comparison with that provided in the case of the control valve 30. Accordingly, the obliqueness of the connection passage 38 is reversed as well.

In the zero-pressure flow position shown in FIG. 6, the pressure medium flows through the pressure passage 34 into the pocket 41 (and also into the recess 37) and through the connection passage 38 into the pocket 42, from which pocket it flows into the recess 36 as well as into the discharge passage 35. The surface areas on both sides of the piston slide means which are acted upon by low pressure in the case of zero-pressure flow have the same size. No pressure worth mentioning exists within the through-holes 39 and 40.

When the piston slide means 33 is moved from the neutral position shown in FIG. 6 towards its second control position II (FIG. 8), the through-flow cross-sectional area from the pressure passage 34 to the pocket 41 is gradually reduced in width so that a throttle point D1 is formed and also the throughflow cross-sectional area from the recess 36 to the pocket 42 is reduced in size to the same extent thus forming a throttle point D2 which has the same size as the throttle point D1. The pressure in the pressure passage 34 gradually increases. The through-hole 39 establishes a flow connection between the pressure passage 34 and the recess 36 so that the same pressure difference exists in both throttle points D1 and D2 and so that also the surfaces F5 and F6 in which the pressure acts on the surface of the piston slide means have the same size. However, also the surfaces F6 and F7, which are acted upon by the pressure in the discharge passage 35, have the same size, since the connection passage 38 has the effect that this low pressure is also effective within the pocket 41. As soon as the piston slide means has reached the control position II, the pockets 41 and 42 have left the orifice of the pressure passage 34 as well as the recess 36 so that pressure medium can no longer flow from the pressure passage 34 into the discharge passage. Due to the through-hole 39, however, the surface areas acted upon by the pressure in the pressure passage and located in diametrically opposed relation on the circumference of the piston slide means still have the same size. The same applies to the surface areas which are acted upon by the low pressure in the discharge passage. It follows that in this case, too, the pressure acting on the piston slide means is balanced.

When the piston slide means is moved from the neutral position to the other control position I, the connection passage 38 and the through-hole 40 again have the effect that the pressures acting on both circumferential sides of the piston slide means are uniformly distributed over surface areas having the same size.

I claim:

1. A control valve device including at least one control valve, in particular for use with high-pressure hydraulic systems having high flow rates, comprising a housing within which a piston slide means can be displaced in at least one housing bore from a neutral position with zero-pressure flow to at least one control position for the purpose of controlling the pressure medium flow, the zero-pressure flow being blocked by said piston slide means in said control position, and further comprising at least one pressure passage leading to and at least one discharge passage leading away from the housing bore, said pressure passage and said discharge passage being adapted to be interconnected through flow conduits provided in the piston slide means, characterized in that the discharge passage (9, 12, 35) ends in the housing bore (3, 32) at a location displaced relative to the pressure passage (5, 6, 34) in the longitudinal direction of the bore, that the pressure passage and the discharge passage orifices (7, 10) in the housing bore are each diametrically opposed by a recess (6b, 12b; 36, 37) of the same size which is open towards the housing bore (3), that each recess (6b, 12b; 36, 37) has applied thereto the pressure existing within the respective opposite passage (5, 6; 34; 9, 12; 35) via at least one pressure or discharge connection passage (6a, 6; 12a, 12; 38, 39, 40) and that the piston slide means has provided therein in front of each passage orifice (7, 10) a longitudinally extending pocket (13, 14; 41, 42) bridging in the neutral position the longitudinal displacement between the respective passage orifice (7, 10) and the respective neighbouring recess (6b, 12b; 36, 37).

2. A control valve device according to claim 1, in the case of which respective by-pass conduits having applied thereto the pressure existing in the pressure passage and the pressure existing in the discharge passage, respectively, bypass the housing bore within the housing and end in the housing bore opposite the respective passage, characterized in that each by-pass conduit leads into a recess (6b, 12b) and forms for said recess the pressure or discharge connection passage (6, 6a; 12, 12a) through which the recess has applied thereto the pressure existing within the respective passage (5; 9) ending at the diametrically opposed location, and that in the neutral position of the piston slide means each pocket (13, 14) connects a passage (5, 9) to the recess (6b, 12b) located adjacent thereto in the longitudinal direction and, via said recess, to the pressure or discharge connection passage (12, 12a; 6, 6a) in such a way that pressure medium flows from the pressure passage (5), which leads directly to the housing (3), into the discharge connection passage (12, 12a) and in such a way that pressure medium flows from the pressure connection passage (6, 6a) into the discharge passage (9) which leads directly away from the housing bore (3).

3. A control valve device according to claim 2, characterized in that the pressure and the discharge connection passage (6, 6a; 12, 12a) are provided with connection openings (23) located on respective outer surfaces of the housing and separated from the respective associated pressure or discharge passage (5, 9).

4. A control valve device according to claim 3, characterized in that the pockets (13, 14) provided in the piston slide means (4) are connected by a pressure compensation passage (15).

5. A control valve device according to claim 4, comprising in a common housing at least two housing bores which each contain a piston slide means, characterized in that a flow guide system comprising pressure and discharge passages with associated pressure and discharge connection passages and recesses is provided for each housing bore, and that the flow guide system of the—when seen in the direction of flow—front housing bore is connected to the flow guide system of the—when seen in the direction of flow—rear housing bore in such a way that the discharge passage leads from the front housing bore to the pressure passage of the rear housing bore and in such a way that the discharge connection passage of the—when seen in the direction of flow—front housing bore leads to the pressure connection passage of the rear housing bore.

6. A control valve device according to claim 5, comprising two housing bores in a common housing, characterized in that the connection openings which lead to the pressure and pressure connection passages of the flow guide system of the—when seen in the direction of flow—front housing bore and which are provided on one side of the housing are in alignment with the connection openings of the discharge and discharge connection passages of the flow guide system of the rear housing bore, said connection openings being provided on the other side of the housing.

7. A control valve device according to claim 4, comprising two control valves having their housing sides attached to each other and providing continuous zero-pressure flow in the neutral position of the two piston slide means, characterized in that in the case of each housing (2, 2′, 2″, 2‴) the connection openings (23) of the pressure and pressure connection passages (5; 6, 6a; 5′, 6′, 6′a), which are provided on one side of the housing, are, in the longitudinal direction of the bore, displaced relative to the connection openings of the discharge and discharge connection passages (9; 12, 12a; 9′; 12′, 12′a), which are provided on the other side of the housing, in such a way that the housings (2, 2′, 2″, 2‴) can be fitted together in pairs and can be combined with a respective additional, identical housing or with identical pairs of housings while maintaining a continuous zero-pressure flow.

8. A control valve device according to claim 1, characterized in that—when seen in the longitudinal direction of the piston slide means—the piston slide means (33) has provided therein respective throughholes (39, 40) which extend through said piston slide means and which are provided in front of and behind the pockets (41, 42) in spaced relationship therewith, that the pockets (41, 42) are connected by at least one passage (38) within the piston slide means, and that the throughholes (39, 40) together with the passage (38) form the pressure-transmitting connection passages leading to the recesses (36, 37).

9. A control valve device according to claim 8, characterized in that each through-hole (39, 40) has approximately half the size of the passage (38).

10. A control valve device according to claim 9, characterized in that the passage (38) extends at an angle between the pockets (41, 42) in the direction in which the pressure passage (34) orifice is displaced relative to the discharge passage (35) orifice.

11. A control valve device according to claim 8, comprising at least two control valves having the outer sides of their housings attached to one another and providing continuous zero-pressure flow, characterized in that the connection openings of the pressure passage (34, 34') and of the discharge passage (35, 35') are, in the case of each housing (31, 31'), mirror images of one another and displaced in the longitudinal direction of the housing bore in such a way that the housings (31, 31') are adapted to be fitted together in pairs and to be selectively combined with additional identical housings or pairs of housings.

12. A control valve device according to claim 1, characterized in that the pressure and the discharge connection passage (6, 6a; 12, 12a) are provided with connection openings (23) located on respective outer surfaces of the housing and separated from the respective associated pressure or discharge passage (5, 9).

13. A control valve device according to claim 1, characterized in that the pockets (13, 14) provided in the piston slide means (4) are connected by a pressure compensation passage (15).

14. A control valve device according to claim 1, comprising in a common housing at least two housing bores which each contain a piston slide means, characterized in that a flow guide system comprising pressure and discharge passage with associated pressure and discharge connection passages and recesses is provided for each housing bore, and that the flow guide system of the—when seen in the direction of flow—front housing bore is connected to the flow guide system of the—when seen in the direction of flow—rear housing bore in such a way that the discharge passage leads from the front housing bore to the pressure passage of the rear housing bore and in such a way that the discharge connection passage of the—when seen in the direction of flow—front housing bore leads to the pressure connection passage of the rear housing bore.

15. A control valve device according to claim 1, comprising two control valves having their housing sides attached to each other and providing continuous zero-pressure flow in the neutral position of the two piston slide means, characterized in that in the case of each housing (2, 2', 2", 2'") the connection openings (23) of the pressure and pressure connection passages (5; 6, 6a; 5', 6', 6'a), which are provided on one side of the housing, are, in the longitudinal direction of the bore, displaced relative to the connection openings of the discharge and discharge connection passages (9; 12, 12a; 9'; 12', 12'a), which are provided on the other side of the housing, in such a way that the housings (2, 2', 2", 2'") can be fitted together in pairs and can be combined with a respective additional, identical housing or with identical pairs of housings while maintaining a continuous zero-pressure flow.

* * * * *